United States Patent Office 2,880,196
Patented Mar. 31, 1959

2,880,196

POLYAMIDES FROM DIPHENYLADIPIC ACID

Charles E. Frank and Harry Greenberg, Cincinnati, Ohio, assignors to National Distillers and Chemical Corporation, a corporation of Virginia No Drawing. Application June 10, 1955
Serial No. 514,756

3 Claims. (Cl. 260—78)

The present invention relates to new compositions of matter and their preparation and, more particularly, to novel synthetic linear condensation polyamides possessing fiber-forming properties.

In general, the novel compositions of matter embodied herein are prepared by reacting a suitable diamine with a particular dicarboxylic acid reactant or an amide-forming derivative of said dicarboxylic acid reactant, the reaction being carried out under condensation polymerization conditions until polyamides of relatively high molecular weight are produced. As is described hereinafter, and by practice of embodiments of the invention, synthetic linear polyamides may be produced possessing highly useful properties and, particularly depending on the dicarboxylic acid reactant employed, the polyamides may be varied as to fiber-forming characteristics, cold-drawability properties, and others.

In preparation of the novel products embodied herein, the diamine reactant may comprise a primary or secondary diamine characterized by having at least one hydrogen atom attached to each nitrogen atom. Thus, suitable diamines include di-primary amines, primary-secondary amines, and di-secondary amines. Of such amines, aliphatic diamines are preferred, such amines being characterized by having the nitrogen atoms attached to aliphatic carbon atoms. More preferably, the aliphatic diamines contemplated for usage herein are those of relatively long chain length, as for example, a chain length of four or more carbon atoms, with specific examples thereof being aliphatic diamines such as tetramethylene diamine, pentamethylene diamine, hexamethylene diamine, octamethylene diamine, decamethylene diamine, and the like. Structurally, diamines suitable for practice of this invention may be defined as having the formula $$NH_2CH_2RCH_2NH_2$$

in which R is a divalent hydrocarbon radical free from olefinic and acetylenic unsaturation and which has a chain length of at least two carbon atoms. Although such amines in which R is an aliphatic chain are preferred, diamines of the aforesaid structural formula in which R may be alicyclic, aromatic or araliphatic are also contemplated.

An important aspect of this invention is the dicarboxylic acid reactant employed for reaction with the diamines, or mixtures thereof. For practice of this invention, the dicarboxylic acid reactant comprises a diphenyladipic acid or a diphenyladipic acid in which at least one of the phenyl groups may contain alkyl-substituents for nuclear hydrogen atoms, specific examples of such acids being α,α'-diphenyladipic acid and α,α'-ditolylapidic acid. Thus, as embodied herein, the polyamides to which the invention relates may be prepared by reaction between a suitable diamine and a diphenyladipic acid but, more preferably, as described more fully hereinafter, by reaction of a suitable diamine with a dicarboxylic acid reactant in which diphenyladipic acid is a component of said acid reactant in mixture with other dibasic carboxylic acids, illustrative of which are acids such as adipic acid, suberic acid, sebacic acid, and others. Thus, polyamides as embodied herein are characterized by containing units of the following structure

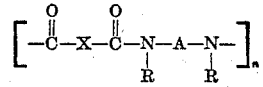

in which X is a hydrocarbon portion of a dicarboxylic acid, A is a hydrocarbon portiton of a diamine, and R is hydrogen, alkyl or an aryl radical; and further characterized in that the polyamides comprise units of the aforesaid structure in which X is the hydrocarbon portion of a diphenyladipic acid, or a diphenyladipic acid in which the phenyl groups may contain alkyl-substituents for nuclear hydrogen atoms. Thus, in embodiments wherein the dicarboxylic acid reactant comprises α,α'-diphenyladipic acid or α,α'-ditolylapidic acid, or mixtures thereof, the polyamides embodied herein are characterized by containing units of the following structure

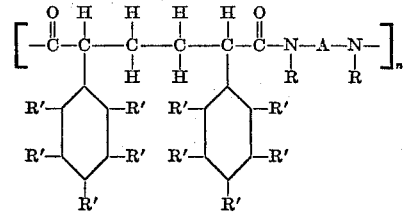

in which R' is hydrogen or alkyl, and A and R have the significance aforedescribed.

The polyamides embodied herein may be prepared by heating in substantially equimolecular amounts a suitable diamine and a dicarboxylic acid reactant comprising diphenyladipic acid and/or derivatives thereof as aforesaid under condensation polymerization conditions, generally from about 180 to about 300° C., in the presence or absence of a diluent, until relatively high molecular weight linear condensation polyamides are obtained, and preferably until the polyamides possess fiber-forming properties. Preferably, the polyamides embodied herein are prepared by use of a dicarboxylic acid reactant comprising a selected mixture of dicarboxylic acids whereby the resulting polyamides yield fibers of excellent cold-drawable characteristics. The preparation of polyamides as embodied herein may be carried out in any of several ways. For example, the diamine and dicarboxylic acid reactants may be intimately mixed in proper proportions and the mixture subjected to condensation polymerization conditions in which case the first reaction that occurs is the formation of diamine-dicarboxylic acid salts, followed by polymerization to formation of polyamides. Another method comprises preparation of a mixture of proper proportions of the diamine and dicarboxylic acid reactant and subjecting the mixture to conditions for formation of diamine-dicarboxylic acid salts, isolation of the salts, purification thereof if desired, and subjecting the salts to reaction conditions for polyamide formation.

As aforesaid, polyamides as embodied herein may also be prepared by use of an amide-forming derivative of the dicarboxylic acid component or components. For such preparations, use is contemplated of amide-forming derivatives of diphenyladipic acid, and/or of other dibasic carboxylic acids used in mixture therewith, such amide-forming derivatives including anhydrides, amides, acid halides, half-esters and diesters which are known to form amides when reacted with a primary or secondary amine. Specific amide-forming derivatives contemplated for use herein include esters of diphenyladipic acid, illustrative of which are the diethyl and dimethyl esters of α,α'-diphenyladipic acid.

In order to further describe the invention, but without intent of limitation, the following illustrative embodiments are set forth. In the preparations set forth, the reactions were carried out under a blanket of dry oxygen-free nitrogen at both atmospheric and subatmospheric pressures in all-glass polymerization tubes heated to known temperatures by provision of vapor jackets of stable compounds at their boiling points.

EXAMPLE I

*Copolymers of 25% diphenyladipic acid and 75% sebacic acid with octamethylene diamine*

A mixture of 12 parts of octamethylene diammonium sebacate (M.P. 178–179° C.) and 4 parts of octamethylene diammonium diphenyladipate (M.P. 245° C., decomposition) were heated at atmospheric pressure for one hour at 200° C., followed by heating for 1 hour at 260° C., and then for 2 hours at 260° C. under vacuum of 0.2 mm. Hg, during which time the reaction product became too thick to permit flow of nitrogen therethrough. On cooling to room temperature, a light yellow, translucent, high molecular weight copolymer was obtained having a softening point of 175° C. Fibers prepared from the melt exhibited excellent cold draw (400% elongation) characteristics.

EXAMPLE II

*Copolymers of 25% diphenyladipic acid and 75% sebacic acid with hexamethylene diamine*

A mixture of the pure salts of sebacic acid and hexamethylene diamine (12 parts) and diphenyladipic acid and hexamethylene diamine (4 parts) were heated under nitrogen at 260° C., and atmospheric pressure for 1½ hours, during which time a clear melt was obtained which increased in viscosity to a point of semi-rigidity. The reaction product was then subjected to reduced pressure (0.3 mm. Hg) for 3 hours at a final temperature of 283° C., and allowed to cool to room temperature whereby a translucent, horny, off-white solid was obtained. Fibers drawn from this material (softening point of 197° C.) exhibited excellent cold draw characteristics.

EXAMPLE III

*Copolymers of 50% diphenyladipic acid and 50% sebacic acid with hexamethylene diamine*

Equal weights of the hexamethylene diammonium salts of diphenyladipic acid and sebacic acid were heated under nitrogen for 1½ hours at atmospheric pressure until evolution of water was complete providing a water white melt. The melt was then heated at 283° C. for 1 hour followed by heating at 283° C. for 2½ hours at 0.3 mm. Hg. The resulting product (softening point of 190° C.) was a clear copolymer that possessed fiber-forming properties and the fibers of which were cold drawable.

EXAMPLE IV

*Copolymers of 75% diphenyladipic acid and 25% sebacic acid with hexamethylene diamine*

Hexamethylene diammonium salts of diphenyladipic acid (3 parts) and sebacic acid (1 part) were polymerized by heating the mixture at 260° C. for 4 hours at atmospheric pressure and 11 hours at 283° C. and 0.3 mm. (Hg) pressure. A clear, hard polymer was obtained which had a softening point of 170° C. and was fiber-forming to fibers having good cold draw properties.

EXAMPLE V

*Copolymers of 50% diphenyladipic acid and 50% of mixed dibasic acids with hexamethylene diamine*

A mixture of acids (5% sebacic, 15% α,α'-diethyladipic acid and 80% α-ethylsuberic acids) was titrated with hexamethylene diamine to the equivalence point, the pH being adjusted to 7.65 for a 10% aqueous solution. An aliquot of this solution containing 8 parts together with 8 parts of hexamethylene diammonium diphenyladipate (M.P. 246° C., decomposition) were placed under nitrogen in a polymerization tube and heated to remove free water by distillation. Heating for 1 hour at 260° C. followed by 1 hour at 283° C. produced a very viscous, clear reaction product. The system was then placed under reduced pressure (0.3 mm. Hg) for seven hours. On cooling to room temperature, a slightly opaque, faintly yellow product (melting point, 184° C.) was obtained that was fiber-forming to cold-drawable fibers.

EXAMPLE VI

*Copolymers of 50% diphenyladipic acid and 50% adipic acid with octamethylene diamine*

Equal parts of the pure salts of diphenyladipic acid and adipic acid with octamethylene diamine, having melting points of 242° C. and 154° C., respectively, were polymerized under the following conditions; 2 hours at 260° C., and 2 hours at 283° C. at atmospheric pressure; and six hours at 283° C. and 0.3 mm. Hg. The resulting product was a clear, extremely tough, fiber-forming (cold-drawable) material having a softening point of 238° C.

EXAMPLE VII 1,8-octamethylene diammonium diphenyladipic acid salt (M.P., 235–245° C., mixture of racemic and meso forms) was polymerized in a nitrogen atmosphere by heating at 260° C. for 23 hours. The resulting product was a high molecular weight polymer that was drawable into fibers.

EXAMPLE VIII

Pure diphenyladipic acid and hexamethylene diamine were reacted in stoichiometric amounts in an alcohol-water solution to produce the hexamethylene diamine salt of the acid. The salt was then polymerized by heating under nitrogen at 260° C. for three hours followed by heating at 260° C. for 20 hours at 100 microns' pressure producing a polymer that could be drawn into fibers.

As is apparent from the foregoing illustrative embodiments, synthetic linear polyamides can be prepared, by use of a dicarboxylic reactant comprising diphenyladipic acid, which possess fiber-forming characteristics and other improved properties. In the use, as the dicarboxylic acid reactant, of diphenyladipic acid or an amide-forming derivative thereof, as well as a diphenyladipic acid in which the phenyl groups contain alkyl-substituents for nuclear hydrogen atoms, a preferred aspect of the invention is that the polyamides be derived by reaction with a relatively long chain aliphatic diamine or mixtures of such amines. In particular, and for formation of polyamides, from diphenyladipic acid, that possess fiber-forming properties, diamines of at least six carbon atoms should be employed, specific examples thereof being diamines such as hexamethylene diamine, octamethylene diamine, decamethylene diamine, and the like. On the other hand, and with reference to the aspect of the invention wherein the dicarboxylic acid reactant comprises diphenyladipic acid, or derivatives thereof as aforedescribed, in mixture with another dicarboxylic acid, judicious use of the diamine and acid components provides polyamides that are fiber-forming to cold-drawable fibers and are of improved transparency characteristics in contrast with the usual translucency and opaqueness of substantially corresponding polyamides in which diphenyladipic acid is not employed as a component of the dibasic acid reactant. For example, and as set forth in Example Nos. III, IV, and VI, the polyamide produced therein by reaction of the defined diamines and mixtures of diphenyladipic acid with adipic acid or sebacic acid produced a clear polyamide. In the use of a dicarboxylic acid reactant comprising diphenyladipic acid and another dibasic carboxylic acid, the proportional amount of diphenyladipic to the other acid may be varied over a rather wide range, depending upon the particular results desired and the particular dicarboxylic acid employed in addition to diphenyladipic acid. Preferably, the acid other than diphenyladipic acid is a relatively long chain aliphatic dicarboxylic acid having from about six to about ten carbon atoms with suitable illustrations thereof being adipic acid, suberic acid, sebacic acid, and others. The relative amount of diphenyladipic acid employed in combination with another dibasic acid as aforedescribed may be varied depending upon the particular results desired. However, for production of polyamides that are fiber-forming to cold-drawable fibers, and which generally possess improved clarity characteristics over the corresponding polyamide in which diphenyladipic acid is not a component of the dibasic reactant, the polyamides as embodied herein are generally prepared by reacting, under condensation polymerization conditions, a suitable diamine and a dicarboxylic acid reactant comprising from about 25% up to about 75% of diphenyladipic acid in mixture with an aliphatic dibasic acid, such as adipic acid, sebacic acid, and the like. Preferred dicarboxylic acid reactants for preparation of clear polyamides that are fiber-forming to cold-drawable fibers comprise a mixture of substantially equal parts of diphenyladipic acid and an aliphatic dicarboxylic acid, illustrations of which are adipic acid, sebacic acid, and the like.

As is apparent from the foregoing, practice of the invention with dibasic reactants comprising diphenyladipic acid provides synthetic linear polyamides that are useful not only as fiber-forming materials, but also as molding plastics and film-forming substances. Moreover, and as also aforesaid, the use of diphenyladipic acid in combination with other dibasic carboxylic acids such as the relatively long chain straight chain aliphatic dicarboxylic acids provides copolyamides that not only possess excellent cold-draw characteristics but, in addition, are of particularly improved characteristics with respect to clarity. Other advantageous properties that result from the use of diphenyladipic acid in preparation of the polyamides are, in general, improvements in resistance to water absorption. This is a particularly important property for such uses as photographic film, precision molded articles, and the like, where water absorption at high humidities results in poor dimensional stability. Thus, it was found that the water absorption characteristics of the polymer prepared in Example III is only 5% as compared with a water absorption of 8% for a commercial nylon prepared from hexamethylene diamine and adipic acid. Moreover, by use of diphenyladipic acid in preparation of polyamides as embodied herein, polyamides may be prepared possessing melting point characteristics such that, for polyamide type materials, are capable of being readily processed, including improved extrudability characteristics with minimized requirements for use, if any, of lubricants for extrusion. Other advantageous properties that may be obtained from use of diphenyladipic acid in preparation of polyamides include reduced shrinkage from mold dimensions, improved electrical insulating and machinability characteristics.

In practice of the invention with respect to embodiments for formation of polyamides that are fiber-forming, the polymerization reaction is carried out until the reaction product has a sufficiently high molecular weight to exhibit fiber-forming properties. The fiber-forming stage is reached when the molten polymer, if touched with a rod, results in a continuous filament of considerable strength and pliability upon drawing the rod away. The fiber-forming polyamides of this invention may be spun into continuous filaments by any of several ways as, for example, in accordance with known methods including attachment of a suitable spinnerette to the bottom of the reaction vessel for direct spinning of the polyamide from the reaction vessel; or by dissolving the polyamide in a suitable solvent and extruding the resulting solution through orifices into a liquid that dissolves the solvent but not the polyamides, and collecting the filaments thus formed in a suitable revolving drum or spindle; or by extruding a solution of the polyamide into a heated chamber where the solvent is removed by evaporation; or by extruding the molten polyamides through orifices into the atmosphere where it congeals into a filament.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A clear, fiber-forming, cold drawable, linear copolyamide of an acid mixture of 50% $\alpha,\alpha'$-diphenyladipic acid and 50% sebacic acid with hexamethylene diamine.

2. A clear, fiber-forming, cold drawable, linear copolyamide of an acid mixture of 75% $\alpha,\alpha'$-diphenyladipic acid and 25% sebacic acid with hexamethylene diamine.

3. A clear, fiber-forming, cold drawable, linear copolyamide of an acid mixture of 50% $\alpha,\alpha'$-diphenyladipic acid and 50% adipic acid with octamethylene diamine.

References Cited in the file of this patent
UNITED STATES PATENTS

| 2,252,554 | Carothers | Sept. 20, 1938 |
| 2,533,455 | Hagemeyer | Dec. 12, 1950 |

OTHER REFERENCES

Feltzin et al.: J. Amer. Chem. Soc., vol. 77, pp. 206–210 (1955).